(12) United States Patent
Pixley et al.

(10) Patent No.: US 12,013,602 B2
(45) Date of Patent: Jun. 18, 2024

(54) METHOD OF DETECTING DEFECTIVE PIXELS IN ELECTRONIC DISPLAYS

(71) Applicant: Communications Test Design, Inc., West Chester, PA (US)

(72) Inventors: Zachary Pixley, West Chester, PA (US); Nidhin Davis, Glen Mills, PA (US); Mark Parsons, West Chester, PA (US)

(73) Assignee: COMMUNICATIONS TEST DESIGN, INC., West Chester, PA (US)

(*) Notice: Subject to any disclaimer, the term of this patent is extended or adjusted under 35 U.S.C. 154(b) by 199 days.

(21) Appl. No.: 17/558,870

(22) Filed: Dec. 22, 2021

(65) Prior Publication Data
US 2023/0194915 A1  Jun. 22, 2023

(51) Int. Cl.
*G02F 1/13* (2006.01)
*G01J 1/18* (2006.01)

(52) U.S. Cl.
CPC .............. *G02F 1/1309* (2013.01); *G01J 1/18* (2013.01)

(58) Field of Classification Search
CPC ... G01N 2021/9513; G01N 2021/8887; G01N 21/88; G09G 3/006; G09G 2330/10; G02F 1/1309; G02F 1/136259; G02F 1/13; G02F 1/136254; G06T 7/0002; G06T 7/0004; G06T 2207/30121; G06T 2207/30168; G01J 1/18

USPC ............. 348/246; 382/141, 149; 324/760.01; 356/237.1–237.5, 239.1–239.8, 124–127; 349/192

See application file for complete search history.

(56) References Cited

U.S. PATENT DOCUMENTS

| | | | | |
|---|---|---|---|---|
| 8,184,923 | B2* | 5/2012 | Hayakawa | G09G 3/006 382/275 |
| 8,818,073 | B2* | 8/2014 | Lee | G09G 3/006 382/141 |
| 9,805,458 | B2* | 10/2017 | Parsons | G06T 7/0004 |
| 2006/0244476 | A1 | 11/2006 | Zhang et al. | |
| 2007/0047801 | A1 | 3/2007 | Kojima et al. | |
| 2010/0141810 | A1 | 6/2010 | Wang et al. | |
| 2014/0376800 | A1 | 12/2014 | Cooper et al. | |
| 2017/0278232 | A1 | 9/2017 | Parsons et al. | |

FOREIGN PATENT DOCUMENTS

JP    2001101413 A  *  9/1999

OTHER PUBLICATIONS

International Search Report and Written Opinion for PCT Application No. PCT/US2022/073262 dated Sep. 21, 2022.

* cited by examiner

*Primary Examiner* — Hoa Q Pham
(74) *Attorney, Agent, or Firm* — Duane Morris LLP

(57) ABSTRACT

A method of detecting a defect in an electronic display includes taking a digital image of the electronic display; and electronically determining if an area of the electronic display is defective based on data of the digital image.

5 Claims, 4 Drawing Sheets

METHOD OF DETECTING DEFECTIVE PIXELS IN ELECTRONIC DISPLAYS

BACKGROUND

The present disclosure relates to testing of electronic display panels. More specifically, the present invention relates to detecting defective pixels in a grayscale image of an electronic display panel.

Electronic displays present visual information according to an electrical input signal by emitting light (i.e., active displays) or, alternatively, by modulating available light during the process of reflection or transmission (i.e., passive displays). Examples of electronic display panels are found in computer monitors, kiosks, televisions, signage, and mobile devices such as smart phones, tablets, and laptop computers.

Most conventional electronic displays are flat panels made as a liquid crystal display (LCD) or an organic light-emitting display (OLED). These electronic displays are fabricated with a grid of picture elements or pixels, a smallest addressable element. A digital image is formed on an electronic display by individually addressing each pixel to vary its light intensity. In a color image, a color is typically represented by combining light intensities of three or four pixels, each typically being red, green, blue, or white.

To provide a visually pleasing image, the resolution (number of pixels per unit length) is usually very high so that the dimensions of individual pixels cannot be identified with the naked eye. The pixels are microscopic. As such, semi-conductor type processing methods are used to fabricate such electronic display panels because the pixels are so small. As a result, there is a likelihood that some pixels will not be formed correctly or will be damaged during fabrication. Therefore, specifications and standards have been put in place to limit the number and types of pixel and uniformity defects allowed in an electronic display. Accordingly, methods are needed to increase throughput and accuracy of electronic display inspection during the fabrication process.

SUMMARY

To address the problems described above, the present disclosure provides a method to identify damaged pixels that appear brighter than they should be in an electronic display panel via analysis of an image captured of a displayed image.

According to an embodiment of the present invention, a method of detecting a defect in an electronic display, includes taking a digital image of the electronic display; and determining if an area of the electronic display is defective based on the digital image.

The method can further include building an array of color values for each pixel of the digital image; and calculating a luminance value for each pixel of the digital image based on a color value corresponding to each pixel.

The method can further include calculating an average luminance of pixels adjacent to each pixel of the digital image. In the method, the average luminance is calculated for three pixels directly to the left, directly above, directly to the right, and directly below each pixel of the digital image. The method can further include comparing the average luminance of pixels adjacent to a pixel of the digital image to the luminance of the pixel of the digital image; identifying the pixel of the digital image for further analysis, if the difference in luminance between the pixel of the digital image the average luminance of adjacent pixels exceeds a threshold.

The method can further include, for every pixel of the digital image identified for further analysis, determining if a number of other pixels of the digital image identified for further analysis within a predetermined surrounding area exceeds a predetermined number; and generating a defect map that highlights pixels of the digital image where the predetermined number is exceeded.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

By analyzing the representative luminance of every pixel in a grayscale image of an electronic display panel, the disclosed method is able to isolate and identify potentially defective areas of the display panel. Of concern is non-uniform areas of brightness that can be caused by defective pixels in the display panel, contamination, or defects in an optical stack used in backlighting LCDs. Such a defective area is called "a hot pixel". The disclosed method is described with respect to the flowchart provided in FIG. 2.

Figure 1:
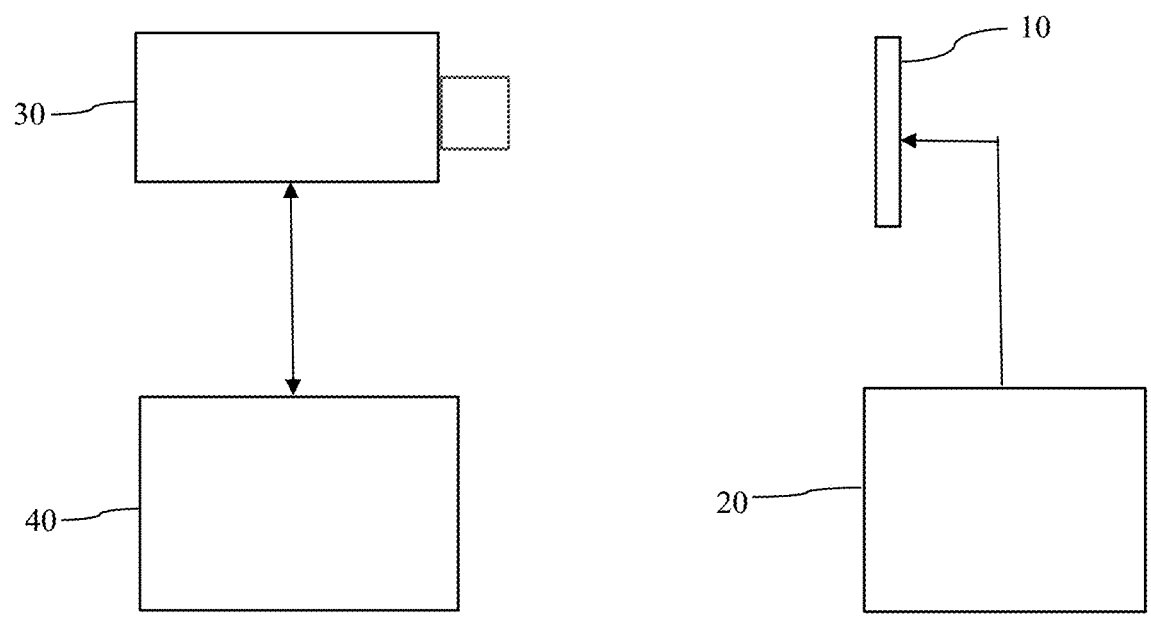
FIG. 1 is a diagram representing a testing arrangement according to an embodiment of the disclosure.

Although not required, preferably a display panel under test is mounted in an automated test apparatus. Optionally, testing can be performed manually or semi-automated. FIG. 1 is a block diagram of a test apparatus used to detect defective pixels of an electronic display 10 under test. FIG. 1 shows that the electronic display 10 under test is driven by a video source 20 to provide a test image on the electronic display 10. A digital camera 30 driven by a computer 40 is used to take a digital image of the electronic display 10.

Figure 2:
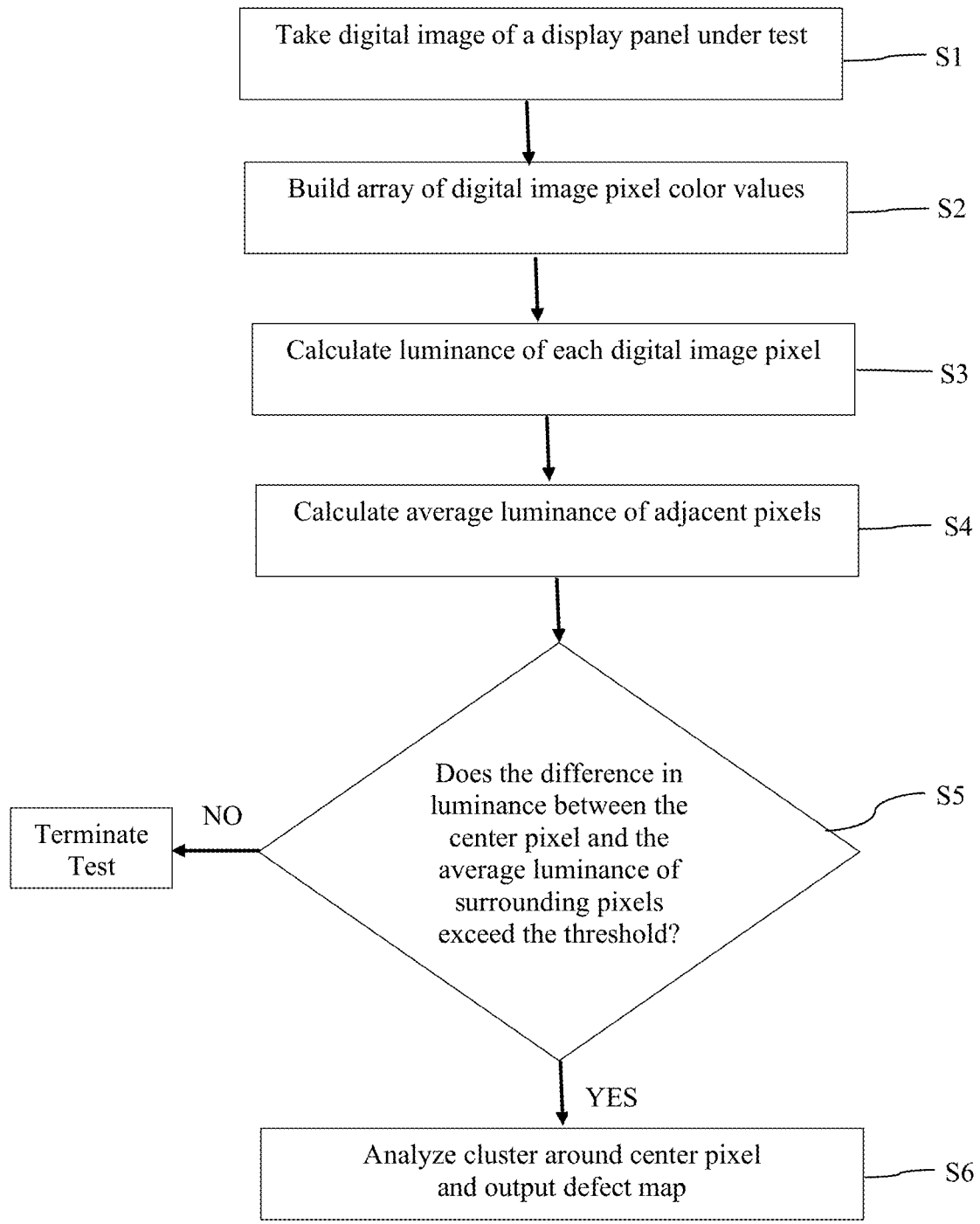
FIG. 2 is a flowchart of a method according to an embodiment of the disclosure.

As shown in FIG. 2, the first step S1 of the method is to take a digital image of a uniform gray color being displayed across an entirety of a display panel being tested using a digital camera. It was found that a grayscale image, between 0-255 but less than full black, is best at exposing a hot pixel area. The particular gray level displayed can be determined using visual experimentation as to which level best shows non-uniformities.

Figure 3:
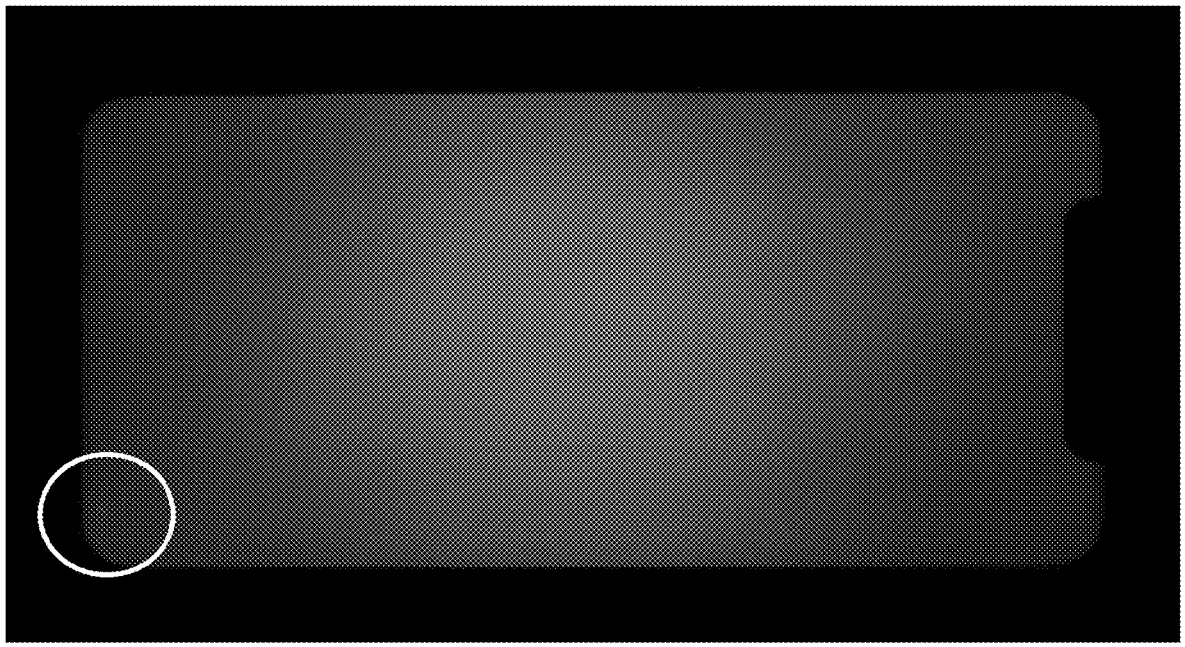
FIGS. 3 and 5 are examples of digital images of an electronic display under test according to an embodiment of the disclosure.

FIG. 3 is an example of a digital image of a display panel taken during testing. The lighter rectangular area is the display panel and the black border area is outside of the display panel. FIG. 3 shows that the display panel has a non-uniform area in the lower left corner of the display panel, a potential hot-pixel area, shown within the white circle.

In step S2, a 2D array is built from the data representing the pixel value of every pixel of the digital image. For example, the data array can include bit allocations for a color map representative of values for the three primary colors, red R, green G, and blue B for the image pixel. This step speeds up processing because the actual image data no longer needs to be interacted with after copying these values. The color values are obtained directly from the image data and saved in memory so that the values can be accessed directly from the memory rather than from image data every single time, which is a relatively longer process.

In step S3, a representative luminance value, L, of each pixel in the digital image is calculated using a formula based on the color values in the newly generated array. For example, the luminance, L, can equal (0.2126*R)+(0.7152*G)+(0.0722*B), where R, G, and B are the corresponding red, green, and blue color values for the digital image pixel. The calculated luminance values for each image pixel are arranged and stored in a 2D data array. By calculating and storing the luminance value of each individual digital image pixel before starting any analysis, it is not necessary to make this calculation for each individual pixel in the next step, speeding up processing time significantly.

After steps S1-S3 are complete, the next step, a first round of analysis, determines potentially problematic hot pixel areas by comparing each pixel in the digital image to their surrounding pixels. This is done by iteratively comparing every value in the luminance array that was calculated in step S3.

In step S4, for each pixel in the digital image, the representative luminance value of three pixels directly adjacent to the left are averaged and the average luminance value is stored. The same is done for three pixels above, below, and to the right of the digital image pixel being analyzed. Pixels that have a luminance value below a predetermined threshold are excluded from these averages and are assumed to be dust, debris, a border, off screen, noise, etc. The threshold is determined experimentally based on "golden" samples and series of trials with dust, debris, and contamination intentionally introduced for obtaining the threshold value. The distance from the center pixel to the surrounding pixels in the comparison is determined by a customizable parameter "hotRegionWidth". This is the actual size of the non-uniform area. For example, the hot pixel can be 10 image pixels wide, or 20 image pixels wide etc. and determined by experimentation.

In step S5, after the average luminance values in the four directions surrounding the center digital image pixel being analyzed are calculated, these luminance values are compared to the luminance value of the center pixel to determine if the center pixel should be identified for a second round of analysis. If the difference in luminance between the center pixel and the average luminance of surrounding pixels exceeds a predetermined threshold parameter "threshold", the center pixel is added to a list to be analyzed further in the next step. The luminance of the center pixel is compared to the average luminance of all the surrounding pixels, i.e., the above average, the below average, and either the left or right average depending on which side of the display panel the center pixel is located. For example, in an image of an LCD, if the center pixel is taken from the left half of the LCD, its luminance value is not compared to the average brightness of pixels to the right of it because the digital image is brighter towards the center of the display (see FIG. 3 for an example of this) and comparing to those values leads to inaccurate results. This condition is an artifact of the digital image taken of an LCD that has certain viewing angle properties. The same is true in the reverse situation where the center pixel is on the right half of the display panel. The center pixel is identified as potentially defective to be analyzed in the next step when its luminance value is greater than the "threshold" of one of the total average, the up average, the down average, and the left or right average.

If no pixel is identified as potentially defective in step S5, then the test is terminated.

If a pixel is identified as potentially defective in step S5, a second round of analysis is performed on the potentially defective pixel in step S6. An analysis of a cluster of pixels around the potentially defective pixel is used to determine if an area (i.e., a group of image pixels) is truly defective. For every pixel identified in step S5, an area around the selected pixel is examined. For example, the area could be a square or any suitable geometric shape. The size of this area is determined by a parameter "defectWidth" and determined empirically. The selected area is marked as a true defect if a number of other pixels identified as potentially defective in that area exceeds a predetermined numbered parameter "maxDefectCount", determined empirically. This step greatly reduces the number of false failures that steps S1-S5 might generate. Once every identified pixel has been examined, an image is generated with the determined defective areas mapped. This image is generated and saved in the test computer for further analysis or for an operator to see where non-uniformities are located for that LCD.

If the number of pixels identified as potentially defective in an area does not exceed "maxDefectCount", then the area is not defective.

Figure 4:
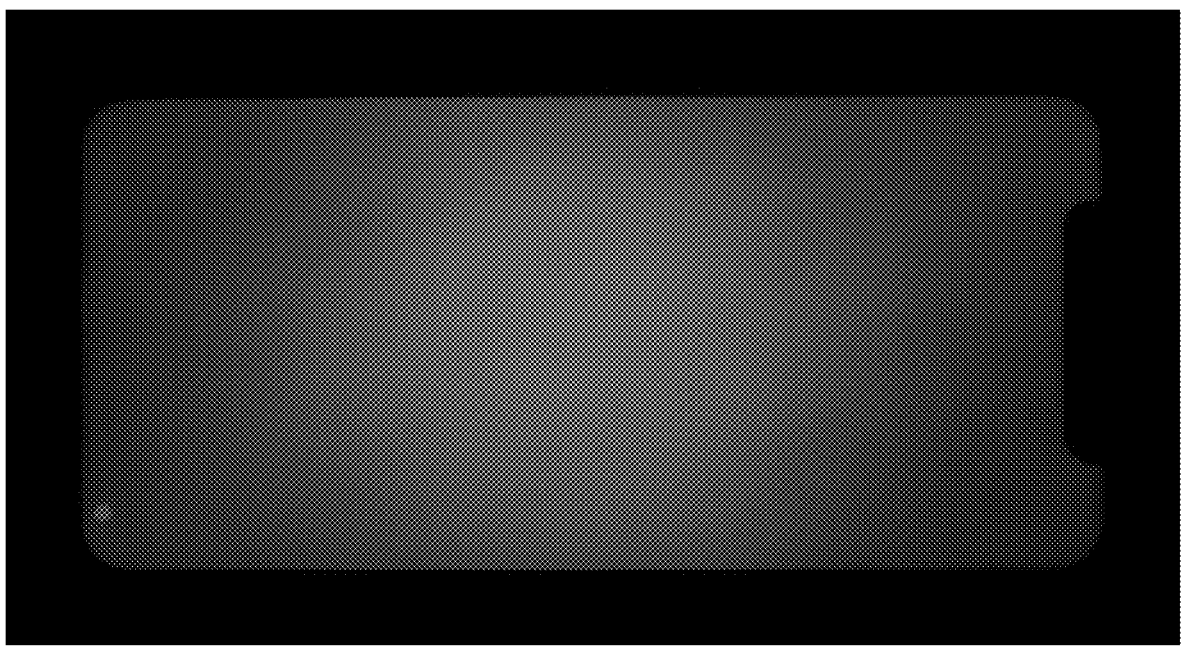
FIGS. 4 and 6 are respective examples of defect maps of the digital images the electronic displays shown in FIGS. 3 and 5 according to an embodiment of the disclosure.
Figure 5:
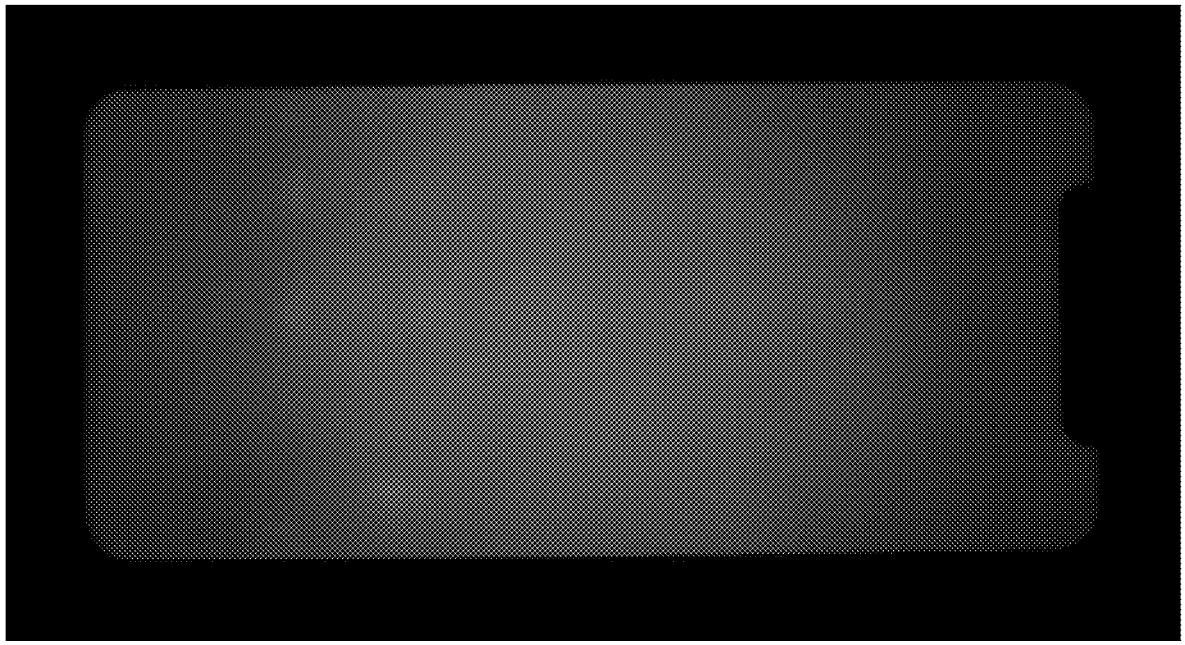
Figure 6:
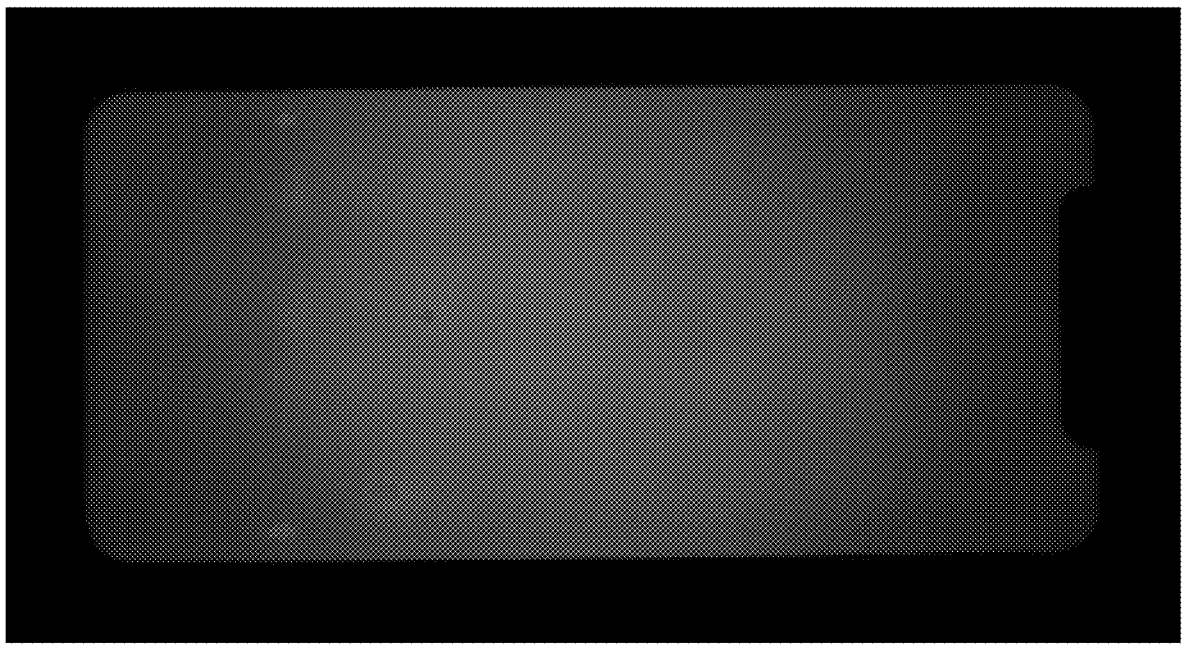

FIGS. 3-6 are images of display panels subjected to the test method described with respect to FIG. 2. FIGS. 3 and 5 are digital images taken at step S1 of two display panels under test that have been driven to the predetermined gray level. FIG. 3 shows a lighter area in the lower left corner of the display panel. FIG. 5 shows several lighter areas in the left side of the display panel. FIG. 4 is an image of the display panel shown in FIG. 4 and includes an area indicating a defect at the same location as the lighter area in the lower left corner of the display panel shown in FIG. 3. Similarly, FIG. 6 includes areas indicating defects at locations of the lighter areas of the display panel shown in FIG. 5. The areas in FIGS. 4 and 6 indicate defects determined by the disclosed method and are examples of images saved at step S6.

It should be understood that the foregoing description is only illustrative of the present disclosure. Various alternatives and modifications can be devised by those skilled in the art without departing from the present disclosure. Accordingly, the present disclosure is intended to embrace all such alternatives, modifications, and variances that fall within the scope of the appended claims.

What is claimed is:

1. A method of detecting a defect in an electronic display, the method comprising:
   driving the electronic display to a display a uniform gray color;
   capturing a single digital image of the electronic display with a digital camera; and
   determining if an area of the electronic display is defective based on the digital image by:
      comparing an average luminance of pixels adjacent to a pixel of the digital image to a luminance of the pixel of the digital image;
      identifying the pixel of the digital image for further analysis, if the difference in luminance between the pixel of the digital image and the average luminance of adjacent pixels exceeds a threshold; and
      for every pixel of the digital image identified for further analysis, determining if a number of other pixels of the digital image identified for further analysis within a predetermined surrounding area exceeds a predetermined number; and generating a defect map that highlights pixels of the digital image where the predetermined number is exceeded.

2. The method of claim 1, further comprising:

building an array of color values for each pixel of the digital image; and calculating a luminance value for each pixel of the digital image based on a color value corresponding to each pixel.

3. The method of claim 1, wherein the average luminance is calculated for three pixels directly to the left, directly above, directly to the right, and directly below each pixel of the digital image.

4. The method of claim 1, wherein the average luminance is calculated for three pixels directly above, directly below, and directly to either the right or the left of each pixel of the digital image depending from which side of the electronic display a corresponding one of each pixel of the digital image is taken.

5. The method of claim 1, wherein the predetermined surrounding area is square.

* * * * *